United States Patent
Chang et al.

(10) Patent No.: US 11,616,627 B2
(45) Date of Patent: Mar. 28, 2023

(54) COMMUNICATION SYSTEM, DATA TRANSMISSION METHOD THEREOF AND USER EQUIPMENT THEREOF

(71) Applicant: Arcadyan Technology Corporation, Hsinchu (TW)

(72) Inventors: Hao-Chun Chang, Hsinchu (TW); Wei-Yang Teng, Hsinchu (TW)

(73) Assignee: Arcadyan Technology Corporation, Hsinchu (TW)

( * ) Notice: Subject to any disclaimer, the term of this patent is extended or adjusted under 35 U.S.C. 154(b) by 77 days.

(21) Appl. No.: 17/224,028

(22) Filed: Apr. 6, 2021

(65) Prior Publication Data
US 2021/0314125 A1  Oct. 7, 2021

(30) Foreign Application Priority Data
Apr. 7, 2020 (TW) .................................. 109111575

(51) Int. Cl.
*H04L 5/00* (2006.01)
(52) U.S. Cl.
CPC .................................. *H04L 5/0055* (2013.01)
(58) Field of Classification Search
CPC ............................. H04L 5/0055; H04L 1/08
USPC .......................................................... 370/329
See application file for complete search history.

(56) References Cited

U.S. PATENT DOCUMENTS

| 2016/0037511 | A1 | 2/2016 | Vincze et al. |
| 2016/0183158 | A1* | 6/2016 | Decarreau ............. H04L 1/1877 370/328 |
| 2018/0279269 | A1* | 9/2018 | Fröberg Olsson .... H04L 1/1825 |
| 2019/0305891 | A1* | 10/2019 | Tang ...................... H04L 1/189 |

OTHER PUBLICATIONS

Communication corresponding to Taiwan Application No. 109111575 and issued by Taiwan Intellectual Property Office dated Mar. 19, 2021, 6 pages.
Communication corresponding to European Application No. 21166648.2 and issued by the European Patent Office dated Sep. 2, 2021, 9 pages.
Huawei et al., "RLC optimization for packet duplication", 3GPP TSG-RAN WG2 Ad Hoc, Jan. 2018, 3 Pages, 3GPP, Vancouver, Canada.

* cited by examiner

*Primary Examiner* — Mang Hang Yeung
(74) *Attorney, Agent, or Firm* — Innovation Counsel LLP

(57) ABSTRACT

A communication system, a data transmission method thereof, and a user device thereof are provided. The data transmission method includes the following steps. A first transmitting Radio Link Control (Tx RLC) entity of a first base station transmits a first Protocol Data Unit (PDU) to a first receiving Radio Link Control (Rx RLC) entity of a user equipment via a first leg. A second Tx RLC entity of a second base station transmits a second PDU to a second Rx RLC entity of the user equipment via a second leg. If the first Rx RLC entity successfully receives the first PDU or the second Rx RLC entity successfully receives the second PDU, the first Rx RLC entity and the second RLC entity return Acknowledgement (ACK) messages.

20 Claims, 6 Drawing Sheets

COMMUNICATION SYSTEM, DATA TRANSMISSION METHOD THEREOF AND USER EQUIPMENT THEREOF

This application claims the benefit of Taiwan application Serial No. 109111575, filed Apr. 7, 2020, the disclosure of which is incorporated by reference herein in its entirety.

TECHNICAL FIELD

The disclosure relates in general to electronic system, an operation method thereof and an electronic device thereof, and more particularly to a communication system, a data transmission method thereof and a user equipment thereof.

BACKGROUND

With the development of wireless communication technology, various wireless communication devices have been developed, such as smart mobile phones, tablet computers, notebook computers, in-vehicle devices, etc. These wireless communication devices have brought considerable convenience to people's lives.

The wireless communication device can download data through the base station. However, in practical applications, the quality of the signal may be affected due to climatic factors, surrounding wireless signal interference or the movement of the wireless communication device. If the wireless communication device cannot successfully obtain data, the wireless communication device will request the base station to retransmit.

In wireless communication technology, too many retransmissions will seriously affect the transmission efficiency. Researchers are working to reduce the number of retransmissions between the wireless communication device and the base station in order to improve the transmission efficiency.

SUMMARY

The disclosure is directed to a communication system, a data transmission method thereof and a user equipment thereof. Mutual communication is used to reduce the number of retransmissions between user equipment and base station.

According to one embodiment, a data transmission method of a communication system is provided. The data transmission method includes the following steps. A first transmitting Radio Link Control (Tx RLC) entity of a first base station transmits a first Protocol Data Unit (PDU) to a first receiving RLC (Rx RLC) entity of a user equipment via a first leg. A second Tx RLC entity of a second base station transmits a second PDU to a second Rx RLC entity of the user equipment via a second leg. If the first Rx RLC entity successfully receives the first PDU or the second Rx RLC entity successfully receives the second PDU, the first Rx RLC entity and the second Rx RLC entity respectively return Acknowledgement (ACK) messages to the first Tx RLC entity and the second Tx RLC entity.

According to another embodiment, a user equipment is provided. The user equipment includes a first receiving Radio Link Control (Rx RLC) entity and a second Rx RLC entity. The first Rx RLC entity is configured to receive a first Protocol Data Unit (PDU) transmitted from a first transmitting Radio Link Control (Tx RLC) entity of a first base station via a first leg. The second Rx RLC entity is configured to receiving a second PDU transmitted from a second Tx RLC entity of a second base station via a second leg. If the first Rx RLC entity successfully receives the first PDU or the second Rx RLC entity successfully receives the second PDU, then the first Rx RLC entity and the second Rx RLC entity respectively return Acknowledgement (ACK) messages to the first Tx RLC entity and the second Tx RLC entity.

According to an alternative embodiment, a communication system is provided. The communication system includes a first base station, a second base station and a user equipment. The first base station includes a first transmitting Radio Link Control (Tx RLC) entity. The first Tx RLC entity is configured to transmit a first Protocol Data Unit (PDU). The second base station includes a second Tx RLC entity. The second Tx RLC entity is configured to transmit a second PDU. The user equipment includes a first receiving Radio Link Control (Rx RLC) entity and a second Rx RLC entity. The first Rx RLC entity is configured to receive the first PDU via a first leg. The second Rx RLC entity is configured to receive a second PDU via a second leg. If the first Rx RLC entity successfully receives the first PDU or the second Rx RLC entity successfully receives the second PDU, then the first Rx RLC entity and the second Rx RLC entity respectively return Acknowledgement (ACK) messages to the first Tx RLC entity and the second Tx RLC entity.

Figure 1:
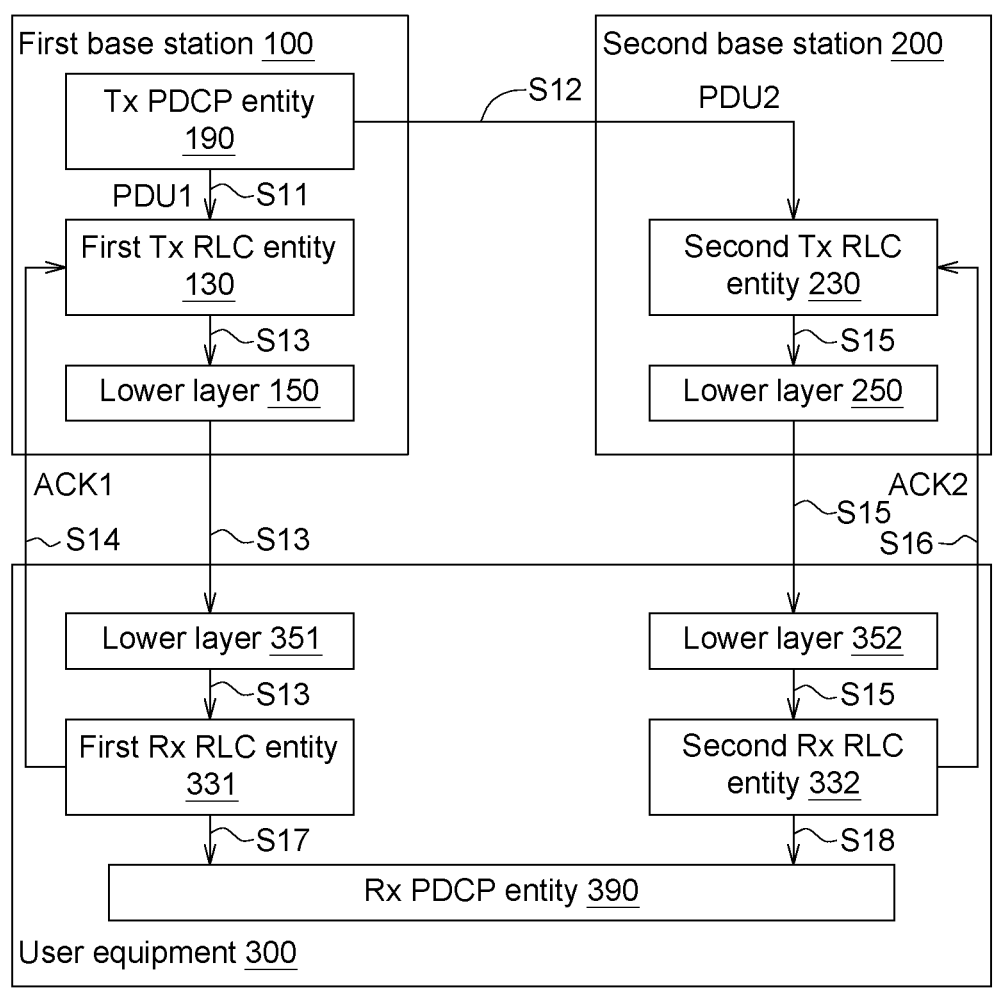
FIG. 1 shows a schematic diagram of a communication system according to one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a schematic diagram of a communication system 1000 according to one embodiment. The communication system 1000 includes a first base station 100, a second base station 200 and a user equipment 300. The first base station 100 and the second base station 200 are, for example, a Macro Cell, a Small Cell; a Femtocell, a Picocell or a Microcell. The user equipment 300 is, for example, a smart mobile phones, a tablet, a notebook or in-vehicle device. The communication system 1000 uses Packet Data Convergence Protocol (PDCP) Duplication to allow the first base station 100 and second base station 200 to coordinate the transmission of the same data.

The first base station 100 includes a transmitting Packet Data Convergence Protocol (Tx PDCP) entity 190, a first transmitting Radio Link Control (Tx RLC) entity 130 and a lower layer 150. The lower layer 150 is for example, a Media Access Control (MAC) layer or a physical layer. The second base station 200 includes a second Tx RLC entity 230 and a lower layer 250. The lower layer 250 is, for example, a MAC layer or a physical layer. The user equipment 300 includes a lower layer 351, a first receiving Radio Link Control (Rx RLC) entity 331, a lower layer 352, a second Rx RLC entity 332 and a receiving Packet Data Convergence Protocol (Rx PDCP) entity 390. The lower layer 351 and the lower layer 352 are, for example, a MAC layer or a physical layer.

The following figures are used to illustrate the data transmission method using PDCP Duplication in the present embodiment. As shown in FIG. 1, in step S11, the Tx PDCP entity 190 of the first base station 100 transmits the first Protocol Data Unit (PDU) PDU1 to the first Tx RLC entity 130.

In step S12, the Tx PDCP entity 190 copies the first PDU PDU1 to a second PDU PDU2 and transmits the second PDU PDU2 to the second Tx RLC entity 230.

Then, in step S13, the first Tx RLC entity 130 transmits the first PDU PDU1 to the first Rx RLC entity 331 of the user equipment 300 via the first leg. In the embodiment of FIG. 1, the first Rx RLC entity 331 successfully receives the first PDU PDU1. Therefore, in step S14, the first Rx RLC entity 331 returns an Acknowledgement (ACK) message ACK1 to the first Tx RLC entity 130.

In step S15, the second Tx RLC entity 230 transmits the second PDU PDU2 toward the second Rx RLC entity 332 of the user equipment 300 via the second leg. In the embodiment in FIG. 1, the second Rx RLC entity 332 also successfully receives the second PDU PDU2. Therefore, in step S16, the second Rx RLC entity 332 returns an ACK message ACK2 to the second Tx RLC entity 230.

In an embodiment, the first Tx RLC entity 130 and the second Tx RLC entity 230 transmit the first PDU PDU1 and the second PDU PDU2 at the same time.

Since the first Rx RLC entity 331 successfully receives the first PDU PDU1, and the second Rx RLC entity 332 also successfully receives the second PDU PDU2, in steps S17 and S18, the Rx PDCP entity 390 can receive the first PDU PDU1 from the first Rx RLC entity 331, and receive the second PDU PDU2 from the second Rx RLC entity 332.

In the case of FIG. 1, the conditions of the first leg and the second leg are quite good, the first Rx RLC entity 331 and the second Rx RLC entity 332 can successfully receive the first PDU PDU1 and the second PDU PDU2. The first Tx RLC entity 130 and second Tx RLC entity 230 confirm retransmission is not needed according to the ACK message ACK1 and the ACK message ACK2.

Figure 2:
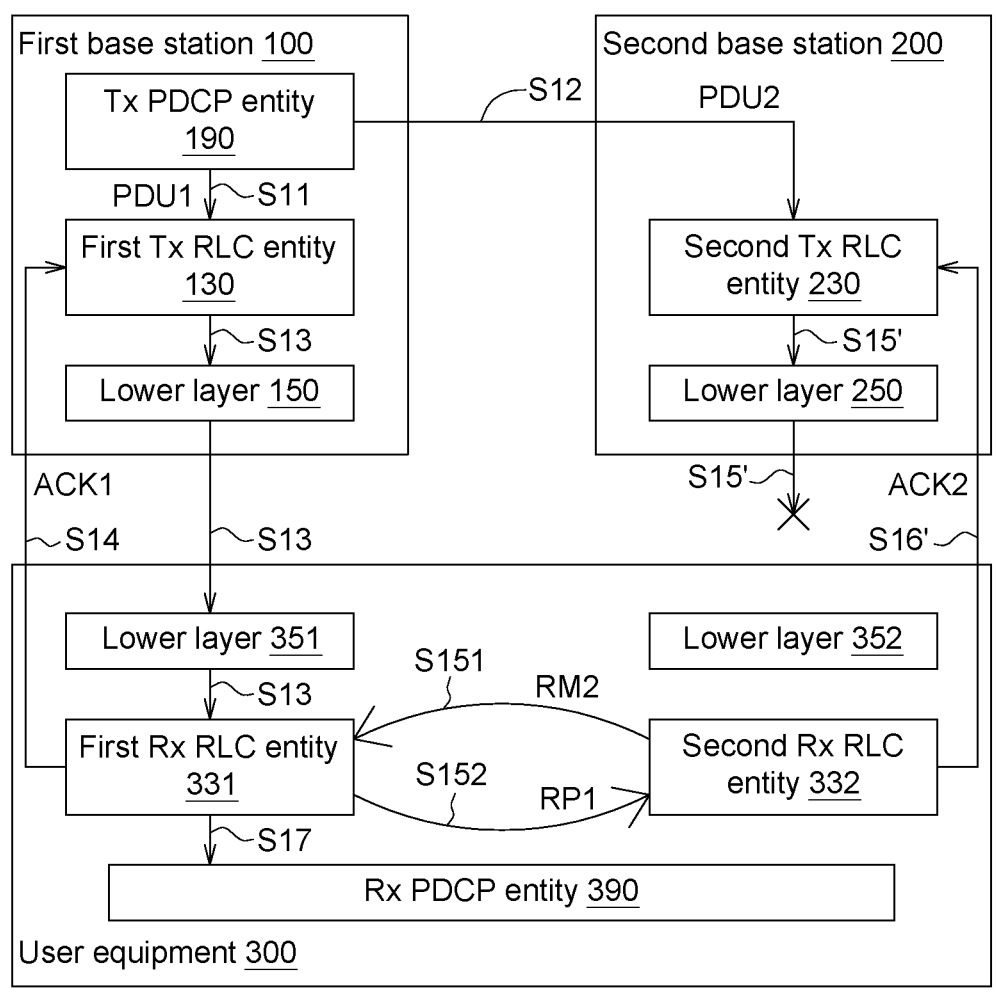
FIG. 2 shows a schematic diagram of the communication system according to another embodiment.

Please refer to FIG. 2, which shows a schematic diagram of the communication system 1000 according to another embodiment. In step S15' in FIG. 2, the second Tx RLC entity 230 transmits the second PDU PDU2 toward the second Rx RLC entity 332 of the user equipment 300 via the second leg. In the embodiment of FIG. 2, the second Rx RLC entity 332 does not successfully receive the second PDU PDU2 within a predetermined time.

Next, in step S151, the second Rx RLC entity 332 transmits a request message RM2 to the first Rx RLC entity 331 to confirm whether the first Rx RLC entity 331 successfully receives the first PDU PDU1.

Then, in step S152, the first Rx RLC entity 331 returns a reply message RP1 to the second Rx RLC entity 332. In the embodiment of FIG. 2, the second Rx RLC entity 332 knows that the first Rx RLC entity 331 successfully receives the first PDU PDU1 through the reply message RP1.

Thus, in step S16', the second Rx RLC entity 332 returns the ACK message ACK2 to the second Tx RLC entity 230.

Since only the first Rx RLC entity 331 successfully receives the first PDU PDU1, the Rx PDCP entity 390 only receives the first PDU PDU1 from the first Rx RLC entity 331 in step S17.

In the case of FIG. 2, the condition of the second leg is poor, so that the second Rx RLC entity 332 does not successfully receive the second PDU PDU2. Since the first Rx RLC entity 331 successfully receives the first PDU PDU1, the second Rx RLC entity 332 transmits the ACK message ACK2 to the second Tx RLC entity 230 to inform the second base station 200 that no retransmission is required.

In this way, the first base station 100 and the second base station 200 can immediately transmit the next message without time-consuming retransmission, which greatly improves transmission efficiency.

Figure 3:
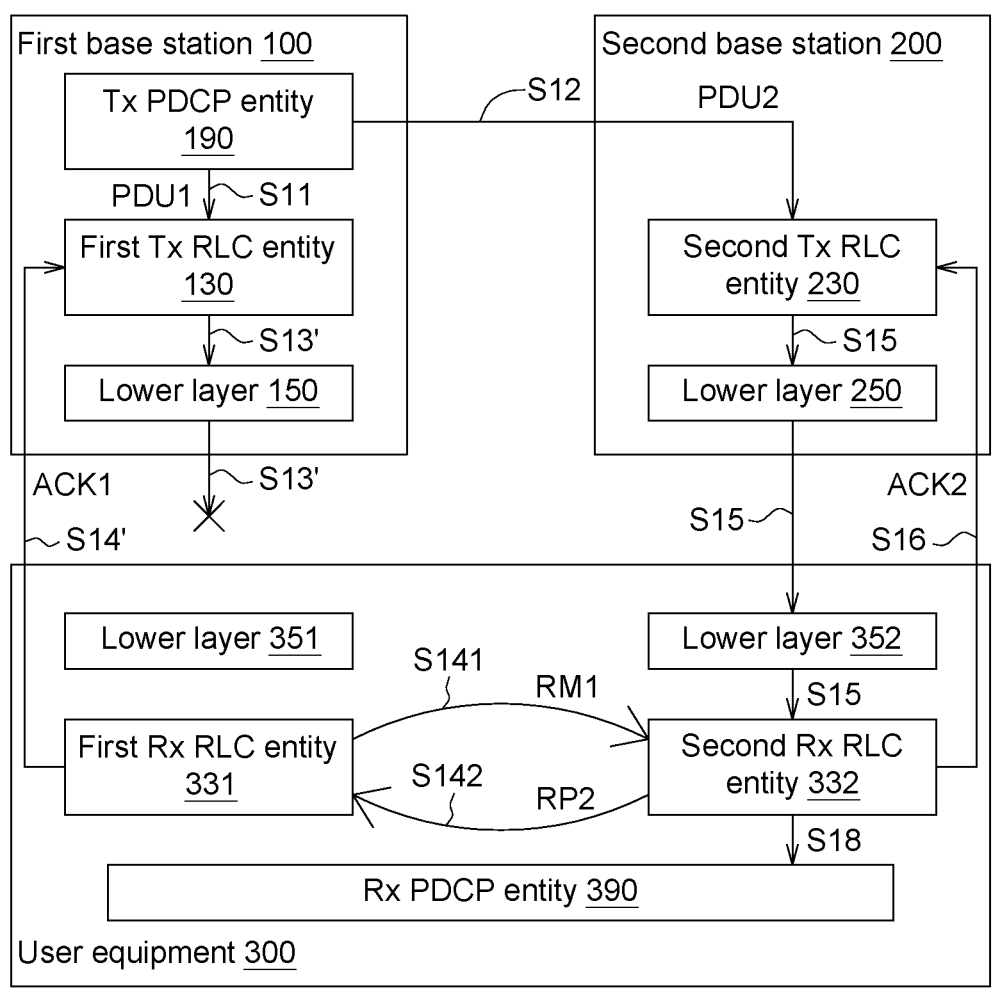
FIG. 3 shows a schematic diagram of the communication system according to another embodiment.

Please refer to FIG. 3, which shows a schematic diagram of the communication system 1000 according to another embodiment. In step S13' in FIG. 3, the first Tx RLC entity 130 transmits the first PDU PDU1 toward the first Rx RLC entity 331 of the user equipment 300 through the first leg. In the embodiment of FIG. 3, the first Rx RLC entity 331 does not successfully receive the first PDU PDU1 within a predetermined time.

Next, in step S141, the first Rx RLC entity 331 transmits a request message RM1 to the second Rx RLC entity 332 to confirm whether the second Rx RLC entity 332 successfully receives the second PDU PDU2.

Then, in step S142, the second Rx RLC entity 332 returns a reply message RP2 to the first Rx RLC entity 331. In the embodiment of FIG. 3, the first Rx RLC entity 331 knows that the second Rx RLC entity 332 successfully receives the second PDU PDU2 through the reply message RP2.

Thus, in step S14', the first Rx RLC entity 331 returns the ACK message ACK1 to the first Tx RLC entity 130.

Since only the second Rx RLC entity 332 successfully receives the second PDU PDU2, the Rx PDCP entity 390 only receives the second PDU PDU2 from the second Rx RLC entity 332 in step S18.

In the case of FIG. 3, the condition of the first leg is poor, so that the first Rx RLC entity 331 does not successfully receive the first PDU PDU1. Since the second Rx RLC entity 332 successfully receives the second PDU PDU2, the first Rx RLC entity 331 transmits the ACK message ACK1 to the first Tx RLC entity 130 to inform the first base station 100 that no retransmission is required.

In this way, the first base station 100 and the second base station 200 can immediately transmit the next information without time-consuming retransmission, greatly improving transmission efficiency.

Figure 4:
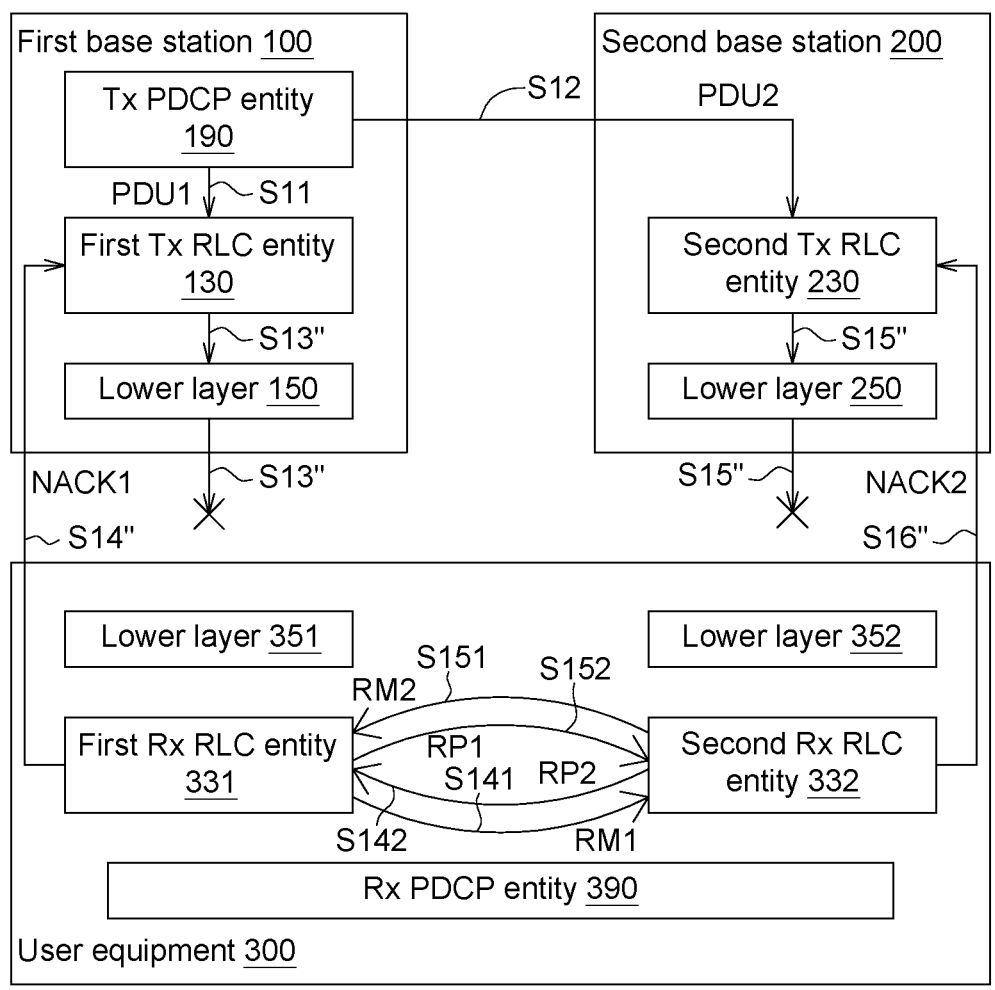
FIG. 4 shows a schematic diagram of the communication system according to another embodiment.

Please refer to FIG. 4, which shows a schematic diagram of the communication system 1000 according to another embodiment. In step S13" in FIG. 4, the first Tx RLC entity 130 transmits the first PDU PDU1 toward the first Rx RLC entity 331 of the user equipment 300 via the first leg. In the embodiment of FIG. 4, the first Rx RLC entity 331 does not successfully receive the first PDU PDU1 within a predetermined time.

Next, in step S141, the first Rx RLC entity 331 transmits the request message RM1 to the second Rx RLC entity 332 to confirm whether the second Rx RLC entity 332 successfully receives the second PDU PDU2.

Then, in step S142, the second Rx RLC entity 332 returns the reply message RP2 to the first Rx RLC entity 331. In the embodiment of FIG. 4, the first Rx RLC entity 331 knows through the reply message RP2 that the second Rx RLC entity 332 does not successfully receive the second PDU PDU2.

Thus, in step S14″, the first Rx RLC entity 331 returns a Negative-Acknowledgement (NACK) message NACK1 to the first Tx RLC entity 130.

In step S15″ of FIG. 4, the second Tx RLC entity 230 transmits the second PDU PDU2 toward the second Rx RLC entity 332 of the user equipment 300 via the second leg. In the embodiment of FIG. 4, the second Rx RLC entity 332 does not successfully receive the second PDU PDU2 within a predetermined time.

Next, in step S151, the second Rx RLC entity 332 transmits the request message RM2 to the first Rx RLC entity 331 to confirm whether the first Rx RLC entity 331 successfully receives the first PDU PDU1.

Then, in step S152, the first Rx RLC entity 331 returns the reply messages RP1 to the second Rx RLC entity 332. In the embodiment of FIG. 4, the second Rx RLC entity 332 knows that the first Rx RLC entity 331 does not successfully receive the first PDU PDU1 through the reply message RP1.

Thus, in step S16″, the second Rx RLC entity 332 returns a NACK message NACK2 to the second Tx RLC entity 230.

Since neither the first Rx RLC entity 331 nor the second Rx RLC entity 332 successfully receives the first PDU PDU1 and the second PDU PDU2, the Rx PDCP entity 390 cannot receive the first PDU PDU1 or the second PDU PDU2 at all.

In the case of FIG. 4, the conditions of the first leg and the second leg are both poor, so that the first Rx RLC entity 331 and the second Rx RLC entity 332 do not successfully receive the first PDU PDU1 and the second PDU PDU2. Therefore, the first Rx RLC entity 331 and the second Rx RLC entity 332 send the NACK messages NACK1, NACK2 to the first Tx RLC entity 130 and the second Tx RLC entity 230 to inform the first base station 100 and the second base station 200 that retransmission is required.

In this way, the first base station 100 and the second base station 200 only retransmit when there is a real need, greatly improving transmission efficiency.

According to the foregoing various embodiments, if the first Rx RLC entity 331 successfully receives the first PDU PDU1 or the second Rx RLC entity 332 successfully receives the second PDU PDU2, then the first Rx RLC entity 331 and the second Rx RLC entity 332 respectively return the ACK messages ACK1, ACK2 to the first Tx RLC entity 130 and the second Tx RLC entity 230.

Only when the first Rx RLC entity 331 does not successfully receive the first PDU PDU1 and the second Rx RLC entity 332 does not successfully receive the second PDU PDU2, the first Rx RLC entity 331 and the second Rx RLC entity 332 will respectively return the NACK messages NACK1, NACK2 to the first Tx RLC entity 130 and the second Tx RLC entity 230.

In the present invention, the request message RM2 is transmitted when the second Rx RLC entity 332 does not successfully receive the second PDU PDU2; the request message RM1 is transmitted when the first Rx RLC entity 331 does not successfully receive the first PDU PDU1.

In summary, please refer to Table 1 below. In the following four cases, only the fourth case needs to request the first base station 100 and the second base station 200 for retransmission, which greatly improves the transmission efficiency.

TABLE 1

|  | First leg | Second leg | Drawings |
| --- | --- | --- | --- |
| First case | Successfully transmitted | Successfully transmitted | FIG. 1 |
| Second case | Successfully transmitted | Unsuccessful transmitted | FIG. 2 |
| Third case | Unsuccessful transmitted | Successfully transmitted | FIG. 3 |
| Fourth case | Unsuccessful transmitted | Unsuccessful transmitted | FIG. 4 |

Figure 5:
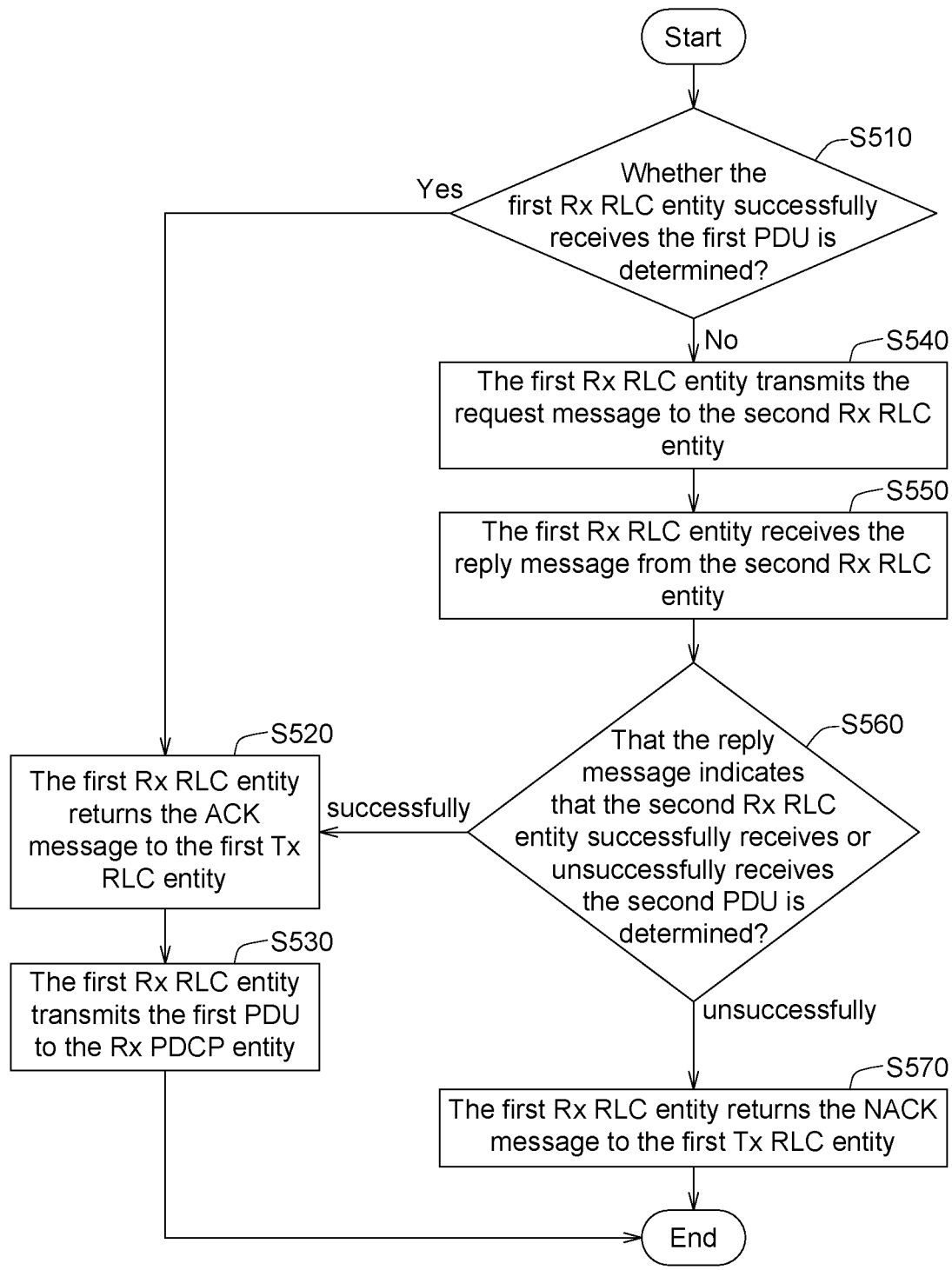
FIG. 5 shows the control method of a first receiving Radio Link Control (Rx RLC) entity.

In the above process, the control method of the first Rx RLC entity 331 is shown in FIG. 5. In step S510, whether the first Rx RLC entity 331 successfully receives the first PDU PDU1 is determined. If the first Rx RLC entity 331 successfully receives the first PDU PDU1, the process proceeds to step S520; if the first Rx RLC entity 331 does not successfully receive the first PDU PDU1, the process proceeds to step S540.

In step S520, the first Rx RLC entity 331 returns the ACK message ACK1 to the first Tx RLC entity 130.

In step S530, the first Rx RLC entity 331 transmits the first PDU PDU1 to the Rx PDCP entity 390.

In step S540, the first Rx RLC entity 331 transmits the request message RM1 to the second Rx RLC entity 332.

In step S550, the first Rx RLC entity 331 receives the reply message RP2 from the second Rx RLC entity 332.

In step S560, that the reply message RP2 indicates that the second Rx RLC entity 332 successfully receives or unsuccessfully receives the second PDU PDU2 is determined. If the reply message RP2 indicates that the second Rx RLC entity 332 successfully receives the second PDU PDU2, the process proceeds to step S520; if the reply message RP2 indicates that the second Rx RLC entity 332 unsuccessfully receives the second PDU PDU2, the process proceeds to step S570.

In step S570, the first Rx RLC entity 331 returns the NACK message NACK1 to the first Tx RLC entity 130.

According to the above control procedure, when the first Rx RLC entity 331 successfully receives the first PDU PDU1 or the second Rx RLC entity 332 successfully receives the second PDU PDU2, it will proceed to step S520 to allow the first Rx RLC entity 331 to return the ACK message ACK1.

When neither the first Rx RLC entity 331 nor the second Rx RLC entity 332 successfully receives the first PDU PDU1 and the second PDU PDU2, it will proceed to step S570 for the first Rx RLC entity 331 to return the NACK message NACK1. Only in this case is it necessary to request the first base station 100 and the second base station 200 for retransmission, which greatly improves transmission efficiency.

Figure 6:
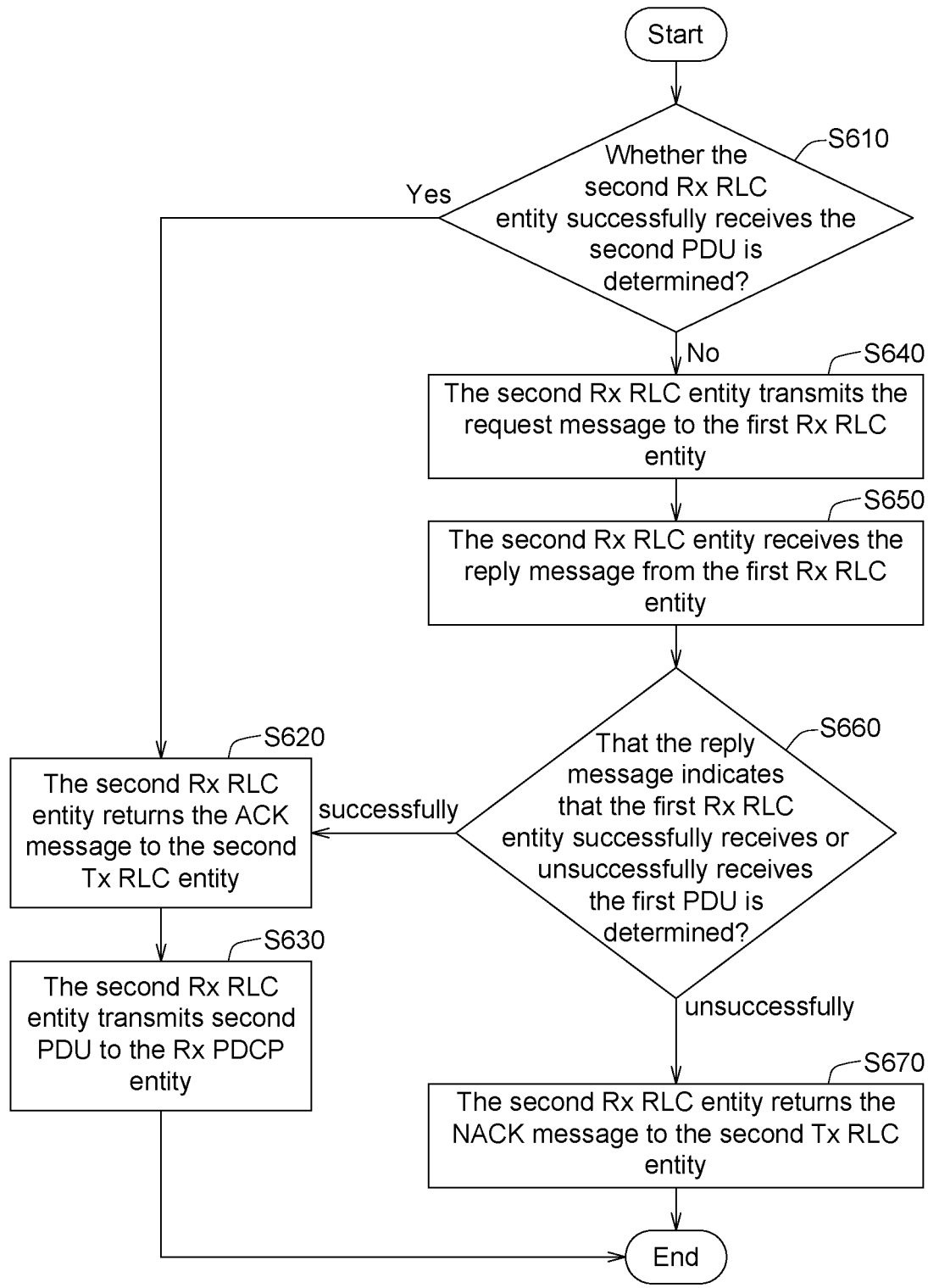
FIG. 6 shows the control method of a second Rx RLC entity.

In the above process, the control method of the second Rx RLC entity 332 is as shown in FIG. 6. In step S610, whether the second Rx RLC entity 332 successfully receives the second PDU PDU2 is determined. If the second Rx RLC entity 332 successfully receives the second PDU PDU2, the process proceeds to step S620; if the second Rx RLC entity 332 does not successfully receive the second PDU PDU2, the process proceeds to step S640.

In step S620, the second Rx RLC entity 332 returns the ACK message ACK2 to the second Tx RLC entity 230.

In step S630, the second Rx RLC entity 332 transmits second PDU PDU2 to the Rx PDCP entity 390.

In step S640, the second Rx RLC entity 332 transmits the request message RM2 to the first Rx RLC entity 331.

In step S650, the second Rx RLC entity 332 receives the reply message RP1 from the first Rx RLC entity 331.

In step S660, that the reply message RP1 indicates that the first Rx RLC entity 331 successfully receives or unsuccessfully receives the first PDU PDU1 is determined. If the reply message RP1 indicates that the first Rx RLC entity 331 successfully receives the first PDU PDU1, the process proceeds to step S620; the reply message RP1 indicates that the first Rx RLC entity 331 unsuccessfully receives the first PDU PDU1, the process proceeds to step S670.

In step S670, the second Rx RLC entity 332 returns the NACK message NACK2 to the second Tx RLC entity 230.

According to the above control procedure, when the first Rx RLC entity 331 successfully receives the first PDU PDU1 or the second Rx RLC entity 332 successfully receives the second PDU PDU2, it will proceed to step S620 to allow the second Rx RLC entity 332 to return the ACK message ACK2.

When both the first Rx RLC entity 331 and the second Rx RLC entity 332 do not successfully receive the first PDU PDU1 and the second PDU PDU2, it will proceed to step S670 for the second Rx RLC entity 332 to return the NACK message NACK2. Only in this case is it necessary to request the first base station 100 and the second base station 200 for retransmission, which greatly improves transmission efficiency.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data transmission method of a communication system, comprising:
   transmitting, by a first transmitting Radio Link Control (Tx RLC) entity of a first base station, a first Protocol Data Unit (PDU) to a first receiving RLC (Rx RLC) entity of a user equipment via a first leg;
   transmitting, by a second Tx RLC entity of a second base station, a second PDU to a second Rx RLC entity of the user equipment via a second leg;
   respectively returning Acknowledgement (ACK) messages from the first Rx RLC entity and the second Rx RLC entity to the first Tx RLC entity and the second Tx RLC entity, responsive to determining that the first Rx RLC entity successfully receives the first PDU and the second Rx RLC entity successfully receives the second PDU;
   respectively returning Acknowledgement (ACK) messages from the first Rx RLC entity and the second Rx RLC entity to the first Tx RLC entity and the second Tx RLC entity, responsive to determining that the first Rx RLC entity successfully receives the first PDU and the second Rx RLC entity does not successfully receive the second PDU; and
   respectively returning Acknowledgement (ACK) messages from the first Rx RLC entity and the second Rx RLC entity to the first Tx RLC entity and the second Tx RLC entity, responsive to determining that the first Rx RLC entity does not successfully receive the first PDU and the second Rx RLC entity successfully receives the second PDU.

2. The data transmission method according to claim 1, further comprising:
   respectively returning Negative-Acknowledgement (NAC K) messages from the first Rx RLC entity and the second Rx RLC entity to the first Tx RLC entity and the second Tx RLC entity, responsive to determining that the first Rx RLC entity does not successfully receive the first PDU and the second Rx RLC entity does not successfully receive the second PDU.

3. The data transmission method according to claim 2, further comprising:
   transmitting, by a transmitting Packet Data Convergence Protocol (Tx PDCP) entity of the first base station, the first Protocol Data Unit (PDU) to the first Tx RLC entity; and
   copying, by the Tx PDCP entity, the first PDU to the second PDU, and transmitting, by the Tx PDCP entity, the second PDU to the second Tx RLC entity.

4. The data transmission method according to claim 3, wherein the first Tx RLC entity and the second Tx RLC entity transmit the first PDU and the second PDU at the same time.

5. The data transmission method according to claim 4, wherein a request message is used for the first Rx RLC entity and the second Rx RLC entity to confirm whether the first Rx RLC entity successfully receives the first PDU or the second Rx RLC entity successfully receives the second PDU.

6. The data transmission method according to claim 5, wherein responsive to determining that the second Rx RLC entity does not successfully receive the second PDU, the request message is transmitted by the second Rx RLC entity.

7. The data transmission method according to claim 6, further comprising:
   receiving, by a Rx PDCP entity of the user equipment, at least one of the first PDU and the second PDU.

8. A user equipment, comprising:
   a first receiving Radio Link Control (Rx RLC) entity, configured to receive a first Protocol Data Unit (PDU) transmitted from a first transmitting Radio Link Control (Tx RLC) entity of a first base station via a first leg; and
   a second Rx RLC entity, configured to receiving a second PDU transmitted from a second Tx RLC entity of a second base station via a second leg,
   wherein the first Rx RLC entity and the second Rx RLC entity respectively return Acknowledgement (ACK) messages to the first Tx RLC entity and the second Tx RLC entity responsive to determining that the first Rx RLC entity successfully receives the first PDU and the second Rx RLC entity successfully receives the second PDU;
   the first Rx RLC entity and the second Rx RLC entity respectively return Acknowledgement (ACK) messages to the first Tx RLC entity and the second Tx RLC entity responsive to determining that the first Rx RLC entity successfully receives the first PDU and the second Rx RLC entity does not successfully receive the second PDU;
   the first Rx RLC entity and the second Rx RLC entity respectively return Acknowledgement (ACK) messages to the first Tx RLC entity and the second Tx RLC entity responsive to determining that the first Rx RLC entity does not successfully receive the first PDU and the second Rx RLC entity successfully receives the second PDU.

9. The user equipment according to claim 8, wherein responsive to determining that the first Rx RLC entity does not receive the first PDU and the second Rx RLC entity does not receive the second PDU, then the first Rx RLC entity and the second Rx RLC entity respectively return Negative- Acknowledgement (NACK) messages to the first Tx RLC entity and the second Tx RLC entity.

10. The user equipment according to claim 9, wherein content of the first PDU is the same as content of the second PDU.

11. The user equipment according to claim 10, wherein the first Tx RLC entity and the second Tx RLC entity transmit the first PDU and the second PDU at the same time.

12. The user equipment according to claim 11, wherein a request message is used for the first Rx RLC entity and the second Rx RLC entity to confirm whether the first Rx RLC entity successfully receives the first PDU or the second Rx RLC entity successfully receives the second PDU.

13. The user equipment according to claim 12, wherein responsive to determining that the second Rx RLC entity does not successfully receive the second PDU, then the request message is transmitted by the second Rx RLC entity.

14. The user equipment according to claim 13, further comprising:
   a Rx PDCP entity, configured to receive at least one of the first PDU and the second PDU.

15. A communication system, comprising:
   a first base station, including a first transmitting Radio Link Control (Tx RLC) entity, wherein the first Tx RLC entity is configured to transmit a first Protocol Data Unit (PDU);
   a second base station, including a second Tx RLC entity, wherein the second Tx RLC entity is configured to transmit a second PDU; and
   a user equipment, including:
      a first receiving Radio Link Control (Rx RLC) entity, configured to receive the first PDU via a first leg; and
      a second Rx RLC entity, configured to receive a second PDU via a second leg,
   wherein the first Rx RLC entity and the second Rx RLC entity respectively return Acknowledgement (ACK) messages to the first Tx RLC entity and the second Tx RLC entity responsive to determining that the first Rx RLC entity successfully receives the first PDU and the second Rx RLC entity successfully receives the second PDU;
   the first Rx RLC entity and the second Rx RLC entity respectively return Acknowledgement (ACK) messages to the first Tx RLC entity and the second Tx RLC entity responsive to determining that the first Rx RLC entity successfully receives the first PDU and the second Rx RLC entity does not successfully receive the second PDU;
   the first Rx RLC entity and the second Rx RLC entity respectively return Acknowledgement (ACK) messages to the first Tx RLC entity and the second Tx RLC entity responsive to determining that the first Rx RLC entity does not successfully receive the first PDU and the second Rx RLC entity successfully receives the second PDU.

16. The communication system according to claim 15, wherein responsive to determining that the first Rx RLC entity does not receive the first PDU and the second Rx RLC entity does not receive the second PDU, then the first Rx RLC entity and the second Rx RLC entity respectively return Negative-Acknowledgement (NACK) messages to the first Tx RLC entity and the second Tx RLC entity.

17. The communication system according to claim 16, wherein the first base station further includes a transmitting Packet Data Convergence Protocol (Tx PDCP) entity, the Tx PDCP entity is configured to transmit the first PDU to the first Tx RLC entity, copy the first PDU to the second PDU, and transmit the second PDU to the second Tx RLC entity.

18. The communication system according to claim 16, wherein the first Tx RLC entity and the second Tx RLC entity transmit the first PDU and the second PDU at the same time.

19. The communication system according to claim 18, wherein a request message is used for the first Rx RLC entity and the second Rx RLC entity to confirm whether the first Rx RLC entity successfully receives the first PDU or the second Rx RLC entity successfully receives the second PDU.

20. The communication system according to claim 19, wherein responsive to determining that the second Rx RLC entity does not successfully receive the second PDU, then the request message is transmitted by the second Rx RLC entity.

* * * * *